UNITED STATES PATENT OFFICE.

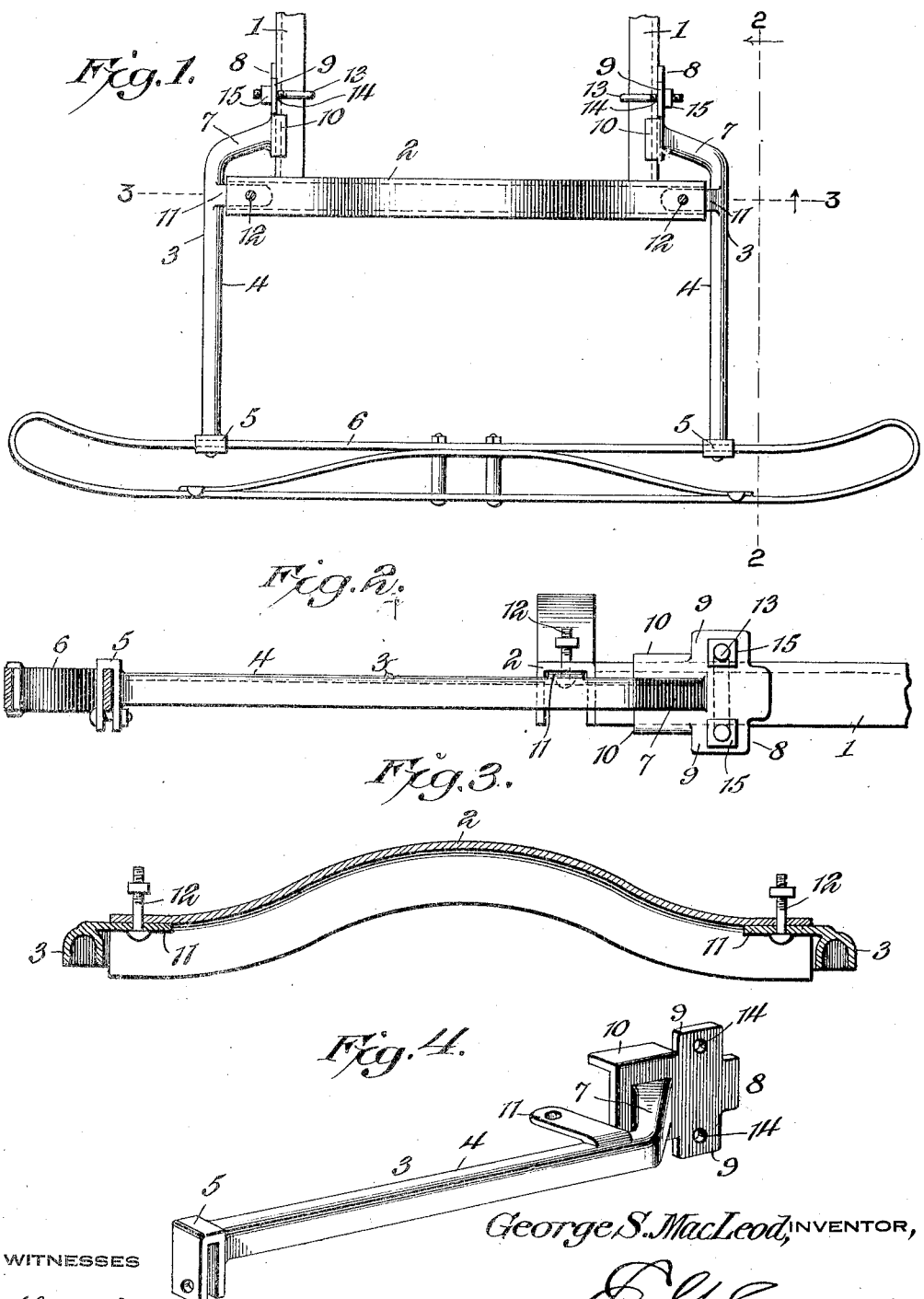

GEORGE STEWARD MacLEOD, OF SEATTLE, WASHINGTON, ASSIGNOR OF ONE-HALF TO ANGUS P. MacLEOD, OF SEATTLE, WASHINGTON.

REAR-BUMPER BRACKET FOR AUTOMOBILES.

1,392,428.  Specification of Letters Patent.  Patented Oct. 4, 1921.

Application filed February 7, 1921. Serial No. 443,082.

*To all whom it may concern:*

Be it known that I, GEORGE S. MACLEOD, a citizen of the United States, residing at Seattle, in the county of King and State of Washington, have invented a new and useful Improvement in Rear-Bumper Brackets for Automobiles, of which the following is a specification.

This invention has reference to rear bumper brackets for automobiles, being especially adapted for attaching and holding a rear bumper to the Ford type of automobiles.

The object of the invention is to provide a bracket which may be applied to the automobile for securing a bumper thereto at the rear end of the automobile, without any change whatever in the structure of the automobile or any part thereof, the attachment being capable of being effected by the use of only such tools as are usually present in the standard tool kit of the automobile.

In accordance with the invention, two bumper brackets are provided, these brackets corresponding except that one is a right hand bracket and the other a left-hand bracket, so as to be applied to the rear end portion of the chassis frame, each bracket having a heel portion applicable directly to the rear end of the side bars of the chassis frame and there secured by means of a U-bolt, while each bracket is provided with side lugs for introduction into the rear cross channel of the automobile frame, in which channel, in the Ford automobile, the rear spring is mounted, the lug being traversed by the body bolt there located.

Each rear bumper bracket is, therefore, held to the corresponding side of the chassis by a U-bolt embracing the side bar of the chassis and by the body bolt on the same side of the chassis, so that there is provided a firm anchorage for each bracket, which not only produces a finished appearance, but so secure a fastening that the brackets are rattle-proof, despite heavy jars or jolts.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:

Figure 1 is a plan view of the rear end of the chassis frame of the automobile with the brackets attached and supporting the rear fender or bumper.

Fig. 2 is a section on the line 2—2 of Fig. 1, all parts except those directly connected with the invention being omitted.

Fig. 3 is a section on the line 3—3 of Fig. 1, and also omitting all parts unnecessary for an understanding of the invention.

Fig. 4 is a perspective view of one of the rear fender or bumper brackets, all other parts being omitted.

Referring to the drawings, there is shown the side bars 1 and rear cross member 2 of the chassis frame of an automobile of the Ford type. The rear cross member 2 is suitably curved to receive and house the crown portion of the rear spring of the Ford automobile, but as such spring does not constitute part of the invention, it is not shown in the drawings. The ends of the rear cross member 2 are arched centrally and then straightened out toward the ends into substantial alinement, while the spring itself continues its curve, whereby there is considerable space remaining within and beneath the cross member 2 above the spring, this being a feature common to the Ford type of automobiles.

The rear bumper bracket equipment consists of two brackets 3 alike except that one bracket is a right-hand bracket and the other a left-hand bracket, so that the description of one bracket will apply to the other, with the single exception noted. Each bracket comprises an elongated stem 4 having at one end, the outer end, a clip terminal 5 designed to receive and hold an appropriate part of a fender or bumper 6, which latter, however, in its construction does not enter into the invention and hence need not be specifically described. The stems 4 are of sufficient length to carry the bumper 6 at an appropriate distance from the rear of the vehicle to which they are applied.

At the end of each stem 4 remote from the bumper 6, that is, at the front end of the stem 4, it is provided with an appropriate curved portion 7 terminating in an expanded plate 8 of an extent to bear flat against the outer face of the corresponding side bar of the chassis and is provided at the top and bottom with ears 9 extending above and below the corresponding side bar 1 and to one side of the ears 9 the plate 8 is provided with lateral lugs 10, so spaced as to engage over the top and under the bottom of the side chassis bar 1 sufficiently to prevent any side or rocking movement of the parts with relation to the chassis frame bars 1.

Projecting from the bracket 3 near the junction of the stem 4 with the curved extension 7, each stem is provided with a lateral lug 11 so shaped as to enter the corresponding end of the rear cross member 2 between the spring and said rear cross member. Near each end of the rear cross member is a passage 12, constituting a bolt-hole to pass the customary body bolt of the automobile, so the same bolt is used for securing the body to the chassis and to secure the corresponding lug 11 to the rear cross member. Each plate 8 is fastened to the respective side bar 1 by means of a U-bolt 13 extending through holes 14 traversing the lugs 10 and held in embracing relation to the side beams 1 by bolts 15. The lugs or tongues 11, together with the body bolts 12, and the U-bolts 13 traversing the plates 8 provide a particularly firm junction between the chassis and the bumper brackets and the rigidity of the bumper structure and its supports is enhanced to such an extent as to resist all tendency to loosen under the jars and jolts to which the structure is subjected, so that rattling is practically eliminated, without the necessity of in any wise changing the automobile frame structure in order to attach the bumper. The bumper structure has the advantage of being applicable to Ford automobiles at the rear of the latter or removable therefrom with a minimum degree of effort and by the use of tools standard to the automobile tool kit.

What is claimed is:—

1. A rear bumper bracket for automobiles, comprising a stem, with a bumper clip at one end and a plate-like expansion at the other end offset with relation to the length of the stem and provided with ears having perforated terminal portions, with the perforations spread apart to a greater extent than the height of the side bars of the automobile chassis and lugs related to over-ride and under-ride the top and bottom of a side bar of the automobile chassis, and said stem having a lateral lug for introduction between the rear cross member of the automobile chassis and the rear spring housed in and underlying said rear cross member.

2. A rear bumper structure for automobiles, comprising a rear bumper, opposite brackets for carrying the bumper to the rear of the automobile, each bracket terminating at the rear end in a clip for receiving and holding the bumper and at the forward end in a plate-like termination with upper and lower perforations spread apart in the direction of the height of the plate to a greater extent than the height of the corresponding side bars of the chassis and having upper and lower lugs associated therewith to embrace a side bar of the chassis frame, a U-bolt extended through the perforations in the plate-like expansion of the stem, and a lug on each stem between the plate-like extension and the rear end of the stem and adapted to enter the outer end of the rear cross member above the rear automobile spring and perforated for the passage of the corresponding body bolt.

3. A rear bumper bracket for automobiles, comprising a stem with a bumper clip at one end and a plate-like expansion at the other end and with the stem adjacent to the plate offset or curved to one side, the plate-like expansion of the stem being adapted to engage against the outer face of the respective side bar of the chassis with upper and lower lugs in embracing relation to the corresponding side bar of the chassis and beyond the lugs having the plate-like expansion provided with upper and lower perforations spaced apart for a greater distance than the height of the side bar of the chassis, the perforations being adapted to receive a U-bolt to embrace the side bar of the chassis and passed through the spaced perforations, and a lug on the stem so related to the plate-like expansion of the stem as to enter between the rear cross member and a vehicle spring underlying it and to receive the body bolt by means of which the body is secured to the rear cross bar.

In testimony that I claim the foregoing as my own, I have hereto affixed my signature.

GEORGE STEWARD MacLEOD